(12) United States Patent
Wu et al.

(10) Patent No.: US 8,549,173 B1
(45) Date of Patent: Oct. 1, 2013

(54) USER-SPACE RESOURCE MANAGEMENT

(75) Inventors: Yuguang Wu, Santa Clara, CA (US);
Junlan Zhou, Sunnyvale, CA (US);
Zhengrong Ji, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1006 days.

(21) Appl. No.: 12/569,405

(22) Filed: Sep. 29, 2009

(51) Int. Cl.
*G06F 15/173* (2006.01)
*H04L 5/12* (2006.01)

(52) U.S. Cl.
USPC ........................................ 709/238; 370/235.1

(58) Field of Classification Search
USPC .................................. 709/238; 370/229–240
See application file for complete search history.

(56) References Cited

U.S. PATENT DOCUMENTS

| | | | |
|---|---|---|---|
| 7,406,694 B2* | 7/2008 | Sen | 719/313 |
| 7,448,049 B1* | 11/2008 | Xing | 719/318 |
| 7,467,225 B2* | 12/2008 | Anerousis et al. | 709/238 |
| 2004/0064759 A1* | 4/2004 | McGuire et al. | 714/39 |
| 2004/0117540 A1* | 6/2004 | Hahn et al. | 711/100 |
| 2008/0259799 A1* | 10/2008 | van Beek | 370/235 |
| 2010/0023576 A1* | 1/2010 | Tober et al. | 709/201 |
| 2011/0225412 A1* | 9/2011 | Van De Ven | 713/2 |
| 2012/0311141 A1* | 12/2012 | Durazzo et al. | 709/224 |

* cited by examiner

*Primary Examiner* — Charles C Jiang
*Assistant Examiner* — Deepa Belur
(74) *Attorney, Agent, or Firm* — Fish & Richardson P.C.

(57) ABSTRACT

Methods, systems, and apparatus, including computer programs encoded on a computer storage medium, for user-space resource management are described. In one aspect, a method includes receiving in a user memory space kernel resource information from a kernel executing in a kernel memory space, the kernel resource information identifying one or more kernel items in the kernel memory space that depend on kernel resources. The method further includes evaluating one or more resource management policies for one or more of the kernel items. The resource management polices are stored in the user memory space. The method further includes selecting a kernel item to be modified based on the evaluation in order to release some or all of the kernel resources, and communicating a request for modification of the selected kernel item to the kernel.

33 Claims, 7 Drawing Sheets

USER-SPACE RESOURCE MANAGEMENT

BACKGROUND

An operating system can divide system memory of a computing device into two distinct regions: kernel space and user space. Kernel space is typically a protected range of memory locations in which a kernel (e.g., one or more core processes of the operating system) executes. User space is a range of memory locations in which user processes execute. A process is an executing instance of a program. User processes cannot access kernel memory directly because kernel memory is protected.

One of the roles of the kernel is to manage various resources of the computing device. Resources can include, but are not limited to, processor cycles (e.g., Central Processing Unit or CPU cycles), memory, and access to input/output (I/O) devices. To modify the ways the kernel manages the resources, an application programmer can modify the kernel by making changes to the kernel source code.

SUMMARY

In general, one aspect of the subject matter described in this specification can be embodied in a method that includes receiving in a user memory space kernel resource information from a kernel executing in a kernel memory space, the kernel resource information identifying one or more kernel items in the kernel memory space that depend on kernel resources; evaluating one or more resource management policies for one or more of the kernel items where the resource management polices are stored in the user memory space; selecting a kernel item to be modified based on the evaluating in order to release some or all of the kernel resources; and communicating a request for modification of the selected kernel item to the kernel.

These and other embodiments can optionally include one or more of the following features. The kernel items can be Address Resolution Protocol (ARP) table entries. The selected kernel item can be least recently used by the kernel among the kernel items. The selected kernel item can be least frequently used by the kernel among the kernel items. The kernel items can be routing table entries. The selected kernel item can be an External Gateway Protocol (EGP) route. The request for modification can include a request for increasing a cost associated with the EGP route. The request can also be a request to delete the selected kernel item. The resource management policies can include one or more policies that each correspond to a kernel resource usage pattern. Evaluating the one or more resource manage policies can include selecting a policy from the resource management policies based on the kernel resource usage pattern.

Particular embodiments of the subject matter described in this specification can be implemented to realize one or more of the following advantages. The techniques described in this specification make it possible to change kernel behavior (e.g., resource management rules or network routing rules) outside the kernel space. Resource management policies (including security policies) of an operating system can be implemented in user space. Implementing resource management policies in the user space obviates the need for a developer to access kernel source code, which can be unavailable to a developer. Even when the developer has access to kernel source code, implementing resource management policies in the user space can free the developer from the complex and sometimes awkward tasks of changing and debugging the kernel.

Techniques for managing resources from user space can allow a developer to fine-tune ways in which resources are managed. For example, customized resource management policies can be applied to kernel resources based on the hardware environment of the kernel. For example, different policies can be implemented based on whether the operating system resides on a server computer, a mobile device, or a network routing device. Furthermore, the resource management policies can be customized based on patterns in which the resources are used (e.g., a more protective policy can be applied when malicious network attacks are detected or suspected). The customized resource management policies, residing in user space, can protect the kernel from running out of resources (e.g., memory) under the network attacks.

Techniques for managing resources from user space can enhance network performance by tuning the behavior of the kernel based on network architecture. Various proactive rules can be implemented such that kernel resources can be made available in anticipation of a request of the kernel resource. When the request actually arrives, the kernel will already have the resources prepared, thus reducing response time for the request.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
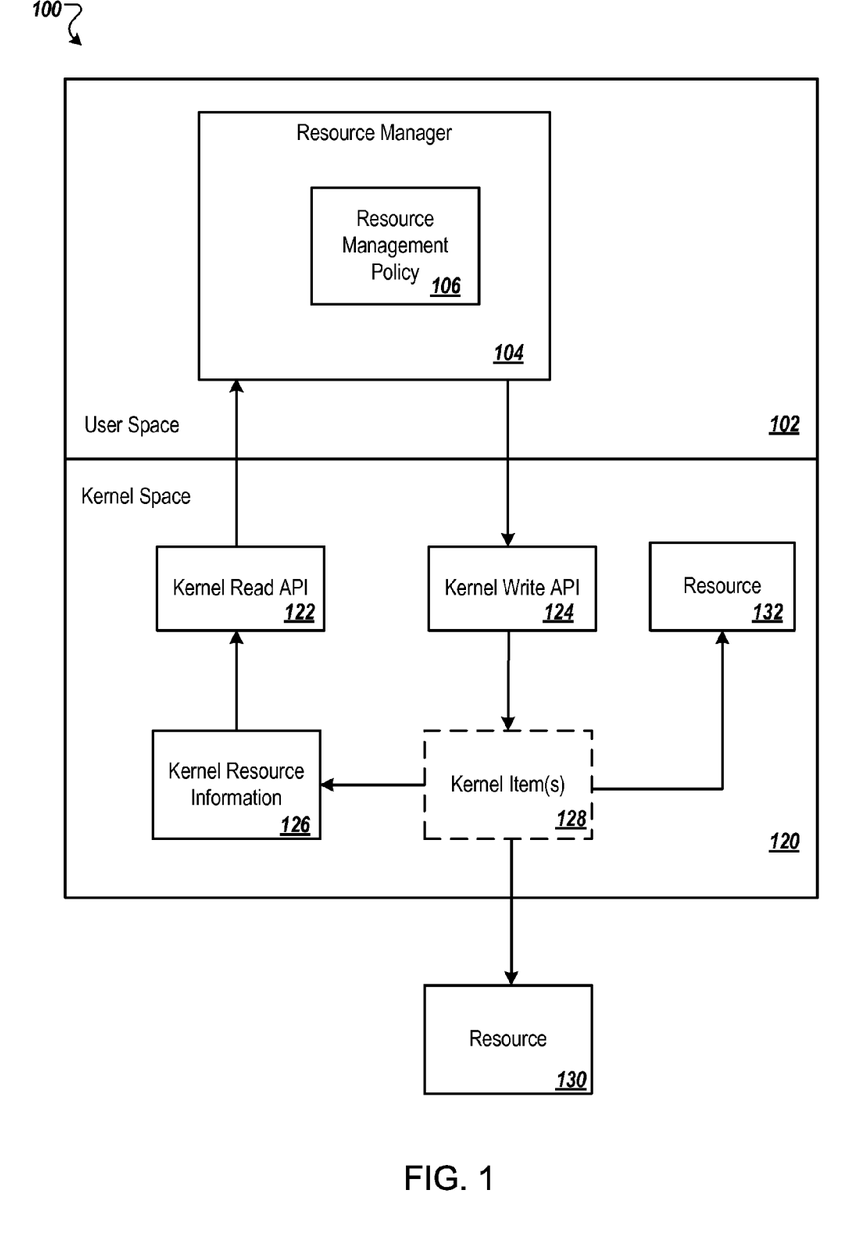
FIG. 1 is a block diagram that provides an overview of example user-space resource management techniques.

FIG. 1 is a block diagram that provides an overview of example user-space resource management techniques. For convenience, the techniques are described with reference to a system that includes memory 100 (e.g., virtual memory), in which an operating system kernel and various user processes execute. The operating system kernel executes in the kernel space 120 and user processes execute in the user space 102. The system can also include various resources. For example, resource 130 can represent information about CPU cycles, whereas resource 132 can represent information about kernel memory.

In general, resource manager 104, executing in user space 102 of memory 100 manages resources conventionally managed by the kernel. Based on resource management policies 106, the resource manager 104 can selectively modify (e.g., update or purge) certain kernel items 128 from a kernel to reclaim kernel resources 130 and 132. In doing so, the resource manager 104 can supplement mechanisms provided in kernel space 120 that protect the kernel from depleting resources 130 and 132. Further detailed descriptions on user-space resource management techniques are provided below.

In general, networked devices (e.g., computer servers, mobile phones, hand-held electronic devices, networking switches, or routers) can be susceptible to Denial of Service (DoS) attacks. The DoS attacks can force the devices to waste precious system resources (e.g., kernel memory 132) on fictitious information or requests, freezing up the resources and render the attacked the devices non-functional.

The user space resource management techniques described in this specification allow the developer to create customized rules for managing resources without modifying the kernel. A user space program (e.g., resource manager 104) manages resources by managing kernel items 128. The resource manager 104, executing in user space 102, includes procedures that replace, enhance, or supplement resource management functions in the kernel.

Memory 100 can be segregated into kernel space 120 and user space 102. In the kernel space 120, kernel items 128 can depend on or consume resources 130 and 132. A kernel item can be anything that depends on a kernel resource. For example, a kernel item can be a process, or data occupying a range of allocated memory. By way of illustration, ARP table entries (a.k.a. ARP cache entries or neighbor table entries) will be used as example kernel items 128 in this specification. An ARP table entry includes an Internet Protocol (IP) address and a corresponding Media Access Control (MAC) address. The ARP table is stored in kernel memory, thus consuming kernel memory space 120 resources.

Kernel space 120 can include various kernel components for managing the ARP table entries. To manage the amount of kernel memory 120 used by the ARP table, the kernel can impose various rules. For example, the kernel can specify a cap, which limits the number of entries that can enter the ARP table. The kernel can also have a timeout rule. The timeout rule can specify that the ARP table entry can stay in the ARP table until the entry expires for not being used for a timeout period (e.g., 60 seconds). Both the cap and the timeout period can be configurable. By way of illustration, the kernel can include the following example rules for managing ARP table entries:

1. The ARP table shall not contain more than 1,000 entries;
2. An ARP table entry that has not been used for 60 seconds shall be purged (e.g., removed) from the ARP table.

Rules (1) and (2) in the kernel alone, however, can be inadequate when the system is under malicious network attacks. The number of ARP table entries can grow large during a "spike" when a large number of network activities occur in a short period of time (e.g., 20 seconds). When the spike is caused by DoS attacks, numerous fictitious entries can rapidly enter into the ARP table, causing the ARP table to reach the kernel imposed limit. The fictitious entries can remain in the ARP table until timed out. However, these newly entered fictitious entries may not be timed out until older (and legitimate) entries are timed out. Thus, for a period of time, old legitimate entries can be timed out, and new legitimate entries can be blocked from entering into the table, leaving a large number of fictitious entries in the ARP table. This can cause the system to fail.

To prevent the system failure, the resource manager 104 can manage ARP table entries in the kernel without requiring modification of the kernel source code. To do so, the resource manager 104 can access kernel resource information 126 by way of a kernel read Application Programming Interface (API) 122 or another suitable interface or protocol. The kernel resource information 126 can include various information on kernel items 128 as well as resources that the kernel items 128 depend on. For example, the kernel resource information 126 can include all or part of the ARP table. Accessing the kernel resource information 126 can including creating a full or partial duplicate of the ARP table in user space 102.

Resource manager 104 can determine which ARP table entries should be removed or modified based on resource management policies 106 and accessed kernel resource information 126. The resource management policies 106 can include various customizable rules to replace, enhance, or supplement kernel rules for managing kernel items 128. By way of illustration, resource management policies 106 can include the following rules that supplement the kernel rules (1) and (2) described above:

A. The ARP table shall be purged if more than 300 entries entered the table in less than 20 seconds;
B. In the purge, the top 400 most recently used entries are preserved; the rest are removed.

The rules in resource management policies 106 are enumerated using a scheme (A, B, C . . . ) that is different from a scheme for kernel rules (1, 2, 3, . . . ) to illustrate the fact that the rules in resource management policies 106 are stored in user space rather than kernel space of the memory. Resource manager 104 can enforce rules (A) and (B) by issuing a purge command to the kernel by way of a kernel write API 124, or other interface or protocol, once a purge condition has been satisfied. In some implementations, the kernel write API 124 causes a request for modification or deletion of the selected kernel item to be sent to the kernel. For example, the kernel write API 124 can include functions that can cause the kernel to remove ARP table entries that are not within the top 400 most recently used. In some implementations, the kernel write API can be packaged in the same software component as kernel read API 122 and share the same socket for communicating between the kernel and user space programs. The kernel items 128 is represented in a block with dashed borders to emphasize the fact that some or all of the kernel items 128 can be modified or removed by the resource manager 104.

Rules (A) and (B), working in conjunction with rules (1) and (2), can reduce the chances that fictitious ARP table entries stay in kernel memory and block out legitimate entries. Thus, resources can be better protected from DoS attacks than using rules (1) and (2) alone. Furthermore, the better protection can be achieved without modifying the kernel source code.

Figure 2:
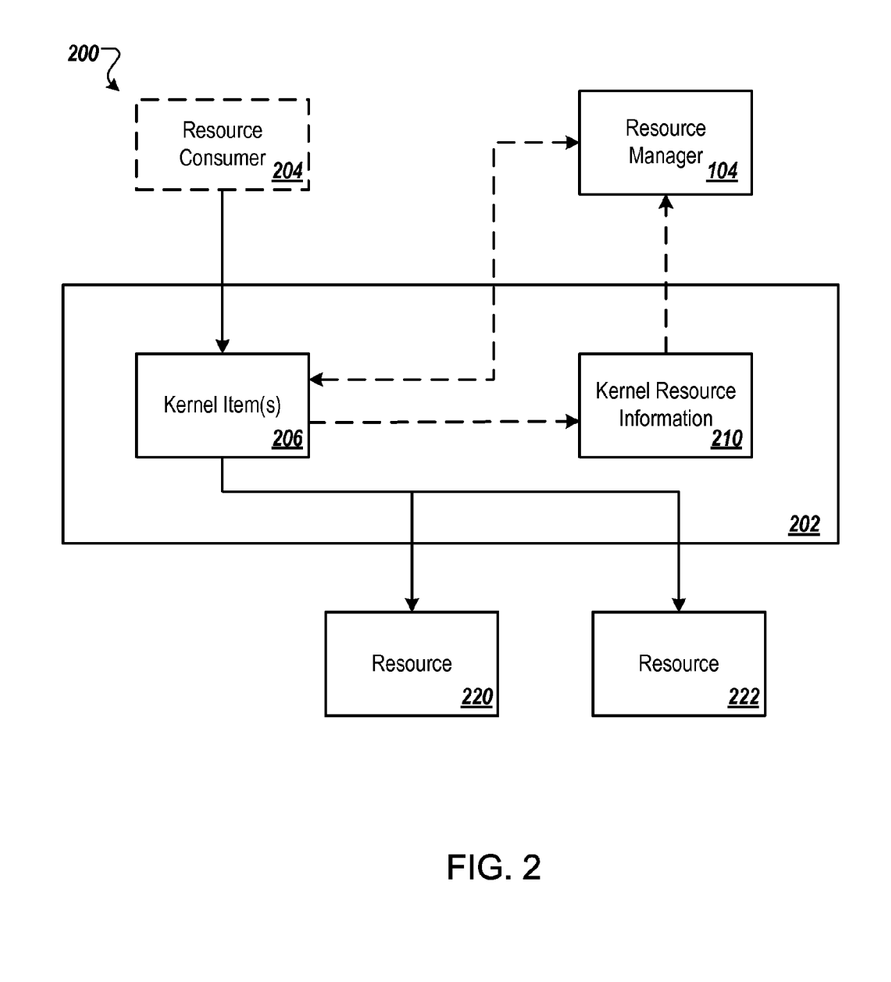
FIG. 2 is a block diagram illustrating relationships between an example user-space resource management program and various kernel components.

FIG. 2 is a block diagram illustrating relationships between an example user-space resource management program and various kernel components. In system 200, kernel 202 (e.g., a Linux kernel) can execute in a kernel space of system memory. Other application programs (e.g., resource manager 104) can execute in a user space. System 200 can include various resources 130 and 132. Resources can include kernel space memory, user space memory, CPU cycles, access to I/O devices, and so on. By way of illustration, resource consumer 204 consumes resources by creating one or more kernel items 128.

Resource consumer 204 is shown in a block with dashed borders to illustrate the fact that the resource consumer 204 can be either a part of system 200 or an entity external to system 200. In some implementations, the resource consumer 204 can be an application program that executes in the user space memory of the system 200.

In some implementations, resource consumer 204 is external to system 200. For example, the system 200 is a control card of a network routing device. Network traffic can consume the resources (e.g., by causing ARP entries to be created). The network traffic can be local traffic (e.g., traffic destined to or originated from a network directly connected to the routing device) or transit traffic (e.g., traffic that needs to be forwarded to another routing device). In either case, the traffic includes ARP requests and responses. Kernel 202, running on the control card, resolves an IP address to a MAC address for ARP requests. An ARP request includes the IP address. Once the kernel 202 receives a response that contains a corresponding MAC address, the kernel 202 can create an ARP table entry that associates the IP address with the MAC address. The ARP table depends on kernel memory for storing the ARP table entry.

User-space resource manager 104 monitors how kernel resources are consumed. To do so, user-space resource manager 104 analyzes kernel resource information 126, which is received from kernel 202. In various implementations, to receive the kernel resource information 126, the user-space resource manager 104 communicates with the kernel 202 using a communication protocol. In some implementations, an Inter-Process Communication (IPC) mechanism (e.g., a netlink socket) can be used. For example, the resource manager 104 can monitor kernel items 128 and resources upon which kernel items 128 depend by invoking a function in a kernel read API through the netlink socket. The function in the kernel API can retrieve the kernel resource information 126 (e.g., part or all of the ARP table) from the kernel 202. In some implementations, the resource manager 104 and the kernel communicate through a region of shared memory. Other communication protocols are possible.

In further implementations, the user-space resource manager 104 can monitor a state of the kernel items 128 by directly monitoring network traffic. As explained above, the network traffic can consume resources by causing kernel 202 to create one or more kernel items 128. Therefore, it is possible to monitor the kernel items 128 and related resources by monitoring network traffic. In some implementations, to monitor the network traffic, the resource manager 104 can create ports (e.g., one or more raw sockets) that can directly interact with network packets. For example, using a raw socket, the user-space resource manager 104 can listen on some or all incoming ARP request packets or reply packets. Using the raw socket, The resource manager 104 can also send ARP queries (e.g., for specific neighbors on specific interfaces).

User-space resource manager 104 can create and maintain a list of mappings between IP addresses and MAC addresses using information collected from either the kernel or the raw socket. The list of mappings can be stored in user space, separate from the ARP table in kernel space. In addition, the resource manager 104 can analyze network usage patterns using the information collected from the raw socket. Various techniques for analyzing network usage patterns will be discussed in further detail below.

User-space resource manager 104 can determine which one or more items of kernel items 128 need to be modified in order to release resources upon which the items depend. For example, the resource manager 104 can determine that certain ARP table entries need to be removed from the ARP table based on the rules (1), (2), (A) and (B) discussed above with reference to FIG. 1. Upon the determination, the user-space resource manager 104 can invoke kernel write API functions to remove the ARP table entries (e.g., through the netlink socket). Removing an ARP table entry can cause the kernel to release the resources (e.g., kernel memory) occupied, used, or otherwise depended upon by the entry.

Figure 3A:
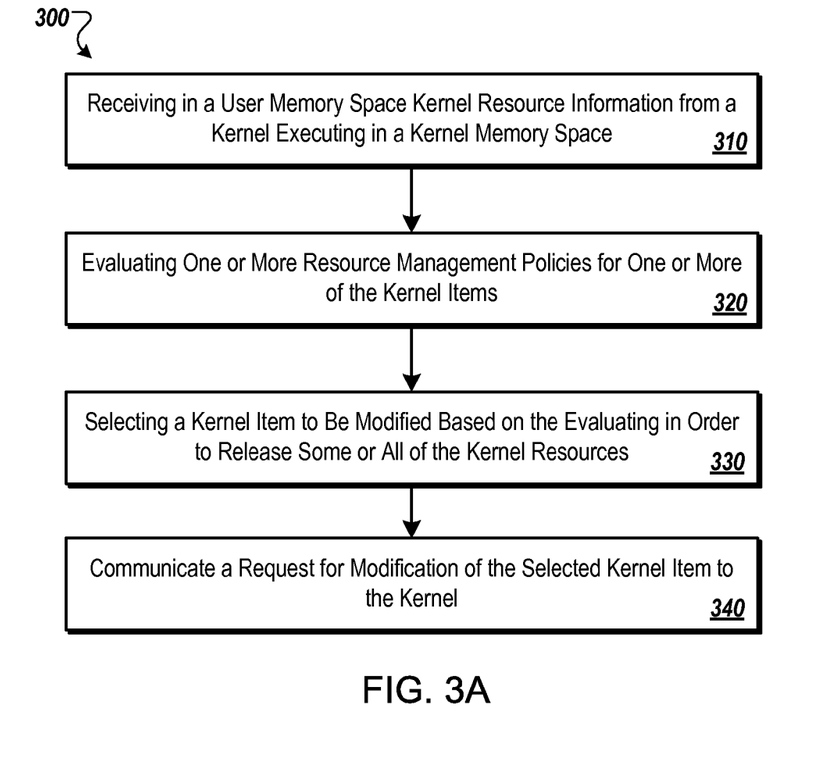
FIG. 3A is a flowchart illustrating an example technique for managing resources using a user-space resource management process.

FIG. 3A is a flowchart illustrating an example technique 300 for managing resources using a user-space resource management process. For convenience, the technique is described with reference to a device that implements the technique.

An operating system of the device can separate memory of the device into a user memory space and a kernel memory space. In step 310, a process in the user memory space (e.g., resource manager 104) can receive kernel resource information (e.g., 126) from the kernel memory space. The kernel resource information can include one or more kernel items that depend on various resources including kernel resources.

In some implementations, the kernel items can include ARP table entries. Each ARP table entry is a mapping between an IP address and a MAC address. The kernel resource information identifying the ARP table entries can include various parameters associated with the mappings. By way of illustration, the parameters can include, but are not limited to, time since the mapping was created in the ARP table, time since the mapping was last refreshed, time since the mapping was last used, a type of the mapping (e.g., whether the mapping is static or dynamic), a network interface identifier of the mapping, etc.

In some implementations, the kernel items can include entries in routing tables. A routing table can include a collection of entries, e.g., rules that are used to determine where data packets traveling over a network should be directed. By way of illustration, the rules can contain, but are not limited to, the following information:

Destination (e.g., an IP address of a data packet's final destination);
Next hop (e.g., an IP address to which the data packet is forwarded);
Interface (e.g., an outgoing network interface);
Routes (e.g., subnets, default hops to use in certain situations); and
Metric (e.g., a cost of each available route).

The entries of a routing table can be stored or viewed in a table format. For example, a routing table can contain three columns: destination, next hop, cost. Each row of the routing table can be a kernel item that consumes or otherwise depends on certain amount of resource (e.g., kernel memory).

ARP table entries and routing table entries are described as example kernel items for illustrative purposes. Kernel items are not limited to ARP table entries and routing table entries. In various implementations, various other kernel items can be managed by the user-space resource manager.

In step 320, the user-space resource manager can evaluate one or more resource management policies for one or more of the kernel items. Evaluating resource management policies (e.g., resource management policies 106) can include selecting a particular management policy based on a resource usage pattern. Further details on usage pattern based policy selection will be described below with reference to FIG. 5.

The resource management policies are stored in the user memory space of the device. Contents of the resource management policies can include various rules affecting the kernel items and resources upon which the kernel items depend. By way of illustration, the kernel item can be an ARP table entry. The resource management policies can include rules on whether to modify the ARP table entry based on various criteria. Modifying the kernel items can including changing the kernel items or removing the kernel items, resulting in releasing some or all of the kernel resources upon which the kernel items depend.

The rules in the resource management policies for changing an ARP table entry can specify which component of the ARP table entry to change. For example, the resource management policies can include rules for changing one or more parameters of the ARP table entry (e.g., increase or decrease a number of seconds since the ARP table entry was last used).

In some implementations, the resource management policies can also include rules for changing the MAC address in the ARP table entry. For example, once the ARP table entry expires (e.g., from non-use or for other reasons), resource manager 104 can send out a probing ARP request to refresh the entry (e.g., to re-establish an IP/MAC address mapping). This action can be specified as a kernel item expiration policy. The kernel item expiration policy can be included in the kernel resource manage policy and stored in the user space.

Example rules in the resource management policies for changing a kernel item are described. Other example contents in the resource management policies will be described in further details in various sections below.

In step 330, the user-space resource manager can select one or more kernel items to be modified based on the evaluation. Selecting the kernel items can include applying various selection policies to determine which kernel item, among a potentially large collection of kernel items, the user-space resource manager can modify.

In some implementations, a kernel item that was least recently used by the kernel among the kernel items can be selected. To do so, the user-space resource manager can rank the kernel items based on an amount of time since each kernel item has been last utilized. By way of illustration, an ARP table entry that was last utilized more recently than another entry is regarded as being more important than the other entry, and is thus ranked higher than the other entry. An ARP table entry is deemed "utilized" when, for example, the entry is used to resolve an IP address to a MAC address (e.g., for transmitting a data packet). The amount of time since last use (TSLU) can be a parameter of the ARP table entry. The parameter can be included in the kernel resource information. A ranking policy that ranks the ARP table entries based on TSLU can be referred to as a Least Recently Used (LRU) policy. In various implementations, the LRU policy can rank all ARP table entries into one ranked list, or rank ARP table entries into a number of ranked lists, each ranked list corresponding to one particular interface (e.g., an incoming interface that receives packets from a particular router, or an outgoing interface that forwards packets to a particular router).

Under LRU policy, more than one least recently used kernel items can be selected. In some implementations, the LRU policy includes rules specifying one or more selection criteria applicable to the ranked lists. By way of illustration, a selection criterion can specify that a configurable number (e.g., 200) of least recently used entries shall be removed. A second selection criterion can specify that another configurable number (e.g., 400) of most recently used entries shall be preserved (e.g., ARP entries situated beyond a preset threshold point from a tail of a ranked list shall be removed). A third selection criterion can specify that if a third configurable number (e.g., 1,000) of entries or more exist in the ARP table, apply the first criterion; otherwise apply the second criterion.

In some implementations, kernel item was least frequently used by the kernel among the kernel items are selected for modification. To do so, the user-space resource manager can rank the kernel items (e.g., ARP table entries) based on a frequency at which each kernel item (e.g., each ARP table entry) has been used. A selection policy that ranks the kernel items based on usage frequency can be referred to as a Least Frequently Used (LFU) policy. By way of illustration, the user-space resource manager can calculate the usage frequency of a particular ARP table entry by measuring a number of data packets corresponding to the ARP table entry in a given period of time. The data packet corresponds to the ARP table entry if the ARP entry is used to resolve a destination of the data packet. The number of data packets in a given time can indicate a traffic intensity of the ARP table entry. Thus, the LFU policy can evaluate a usefulness of the ARP table entry based on the traffic intensity. For example, the more the data traffic corresponding to an entry, the more important the entry, and the higher the entry is ranked.

The user-space resource manager can determine that a particular ARP table entry needs to be modified when the frequency at which the entry has been used satisfies a frequency usage criterion specified in the resource manage policies. By way of illustration, a rule in the LFU policy can specify that if fewer than x packets used a particular ARP table entry in a period of y seconds, then the ARP table entry needs to be removed. In some implementations, one particular ARP table entry or a group of ARP table entries can have a distinct number of packets (x) and number of seconds (y) from other ARP table entries.

As the examples above have shown, LRU and LFU policies can include selection criteria that have flexible forms. A developer can customize the selection criteria based on various factors. By way of illustration, the factors can include whether the device is a server computer, a router, or a mobile device, how heavy the network traffic is, and how likely the device will receive a network attack, among others. In addition, selection policies other than LRU and LFU policies can be applied.

When the kernel resource information includes one or more routing tables, in addition to LRU and LFU policies, the user-space resource manager can specify selection policies customized for managing the routing tables. These selection policies can rank routes in the routing table based on one or more configurable preference values for various routing protocols, in addition to existing kernel ranking. For example, the policies can specify that one particular route in the routing table is preferable to another route. By way of illustration, an Interior Gateway Protocol (IGP) route, e.g., a route that can be used within an autonomous system, can be preferable to an External Gateway Protocol (EGP) route, e.g., a route that can be used between autonomous systems. Therefore, the EGP route can be selected for modification over the IGP route when other factors are equal. The user-space resource manager can modify the EGP route, for example, by increasing the cost associated with the EGP route.

In some implementations, the selection policies on managing routing tables can also include a global limit on routing table size and a per-protocol limit on number of routes under each protocol. The user-space resource manager can purge superfluous routes from the kernel route table using the global limit or the per-protocol limit, or both.

In step 340, the user-space resource manager can communicate a request for modification of the selected kernel item to the kernel. The communication can occur by way of various kernel APIs. As described above in various examples, the request for modification can change or delete one or more kernel items.

The example user-space resource manager that can perform the steps 310-340 as described above can be invoked in various ways. For example, the user-space resource manager can be invoked at device initialization time and execute as a daemon in the background. In some implementations, the daemon monitors the ARP table at fixed, predetermined intervals (e.g., every 1,000 milliseconds). In some implementations, the daemon is configured to monitor the ARP table at a random time interval within a specified range (e.g., between 500 milliseconds and 2,000 milliseconds). In some implementations, the daemon can apply various policies to the ARP table upon a specific event. For example, the daemon can apply the policies when the daemon detects that ARP table 400 is being changed. The daemon can detect a change either through a raw socket (by sniffing ARP packets) or by receiving kernel notification through a kernel API (e.g., through a netlink socket).

Figure 3B:
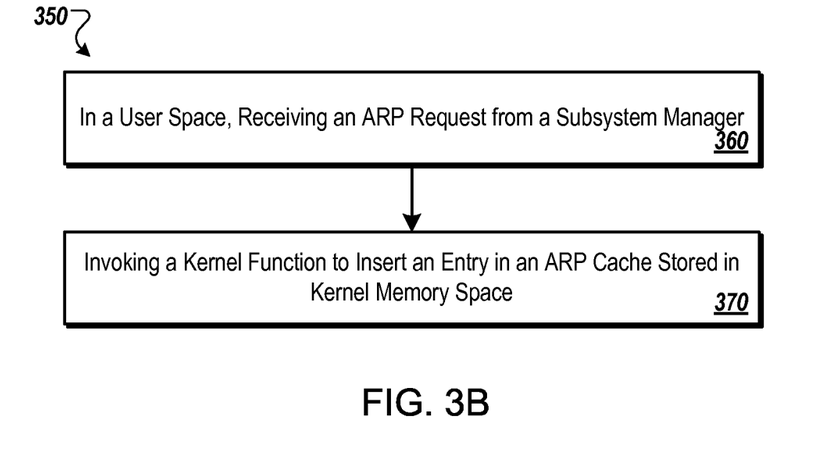
FIG. 3B is a flowchart illustrating an example technique in which the user-space resource manager inserts a kernel item.

FIG. 3B is a flowchart illustrating an example technique 350 in which the user-space resource manager inserts a kernel item. By way of illustration, the technique 350 will be described in reference to a routing device in a network (e.g., a router). In some implementations, the user-space resource manager can execute as a daemon on the routing device if, for example, the operating system is a flavor of Unix. The kernel item can include an ARP table entry.

The user-space resource manager can be configured to update an ARP table upon receiving specific ARP requests from other subsystems inside the device on which the daemon executes. In step 360, the user-space resource manager can receive an ARP request from another subsystem manager such as a routing protocol stack (e.g., an Intermediate System-to-Intermediate System (IS-IS) routing protocol). In some implementations, the ARP request can have a specific format. For example, the ARP request can have a form of interface port, neighbor IP address pairs. The neighbor IP address in the ARP request can be an IP address of a peer router.

In step 370, the user-space resource manager can invoke a kernel function to insert an entry to an ARP table in the kernel memory space on the local router (e.g., the router on which the user-space resource manager executes), if the other subsystem is making the request for a static ARP configuration with a known MAC for the neighbor.

Figure 3C:
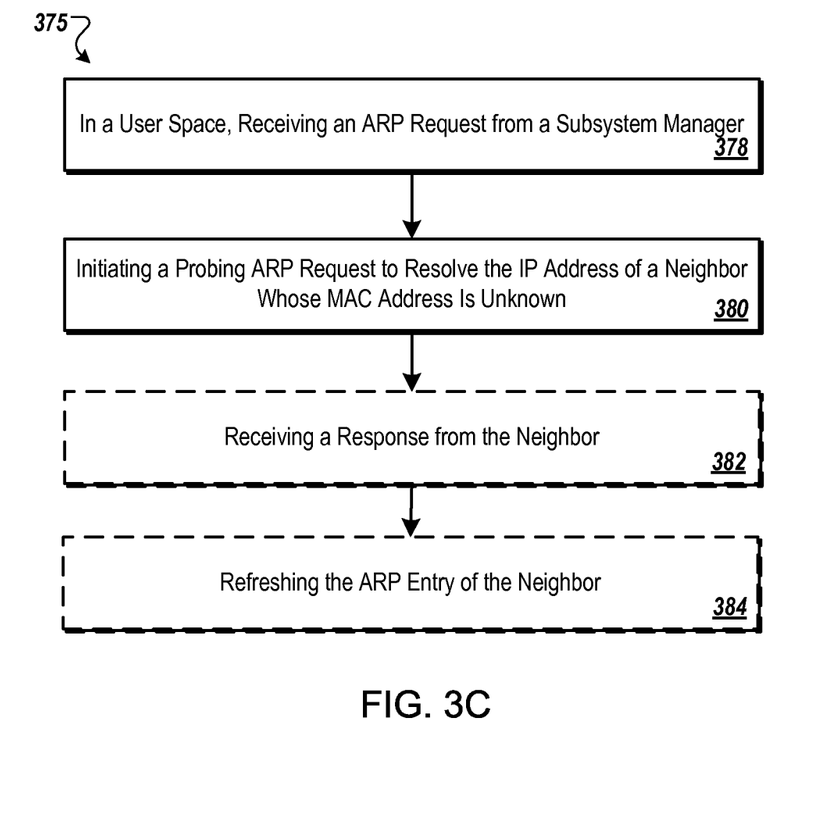
FIG. 3C is a flowchart illustrating an example technique in which the user-space resource manager inserts a kernel item using dynamic probing.

FIG. 3C is a flowchart illustrating an example technique 375 in which the user-space resource manager inserts a kernel item using dynamic probing. In step 378, the user-space resource manager can receive an ARP request from another subsystem manager such as a routing protocol stack (e.g., an IS-IS routing protocol).

In step 380, the user-space resource manager can initiate a probing ARP request, which can be a standard ARP request, to resolve the IP address of a neighbor whose MAC address is unknown to the kernel or the user-space resource manager. The probing ARP request can cause the neighbor to respond with a reply, which contains the MAC address.

In some implementations, the probing ARP request can allow the kernel to automatically update the ARP table. In some implementations, the user-space resource manager can be utilized to update the ARP table. In optional step 382, the user-space resource manager can receive the reply. The reply can be received either though the kernel or through one or more raw sockets. In optional step 384, the user-space resource manager can refresh the ARP entry for this neighbor by associating the MAC address in the reply with the IP address. In some implementations, the refreshing can be done through a kernel write API.

By adding the entry to the local ARP table in response to a reply from the neighboring device using example techniques 350 and 375, the daemon can proactively resolve IP/MAC address mappings for all neighbors whose IP addresses are known, before data traffic arrives. Because the IP/MAC mappings have already been resolved when the actual data packets arrive, the actual data packets do not need to encounter an unknown neighbor MAC address and go to a next-hop entry while relying on a CPU to perform slow-path processing (e.g., resolving the MAC address in a non-time-critical manner).

Figure 4A:
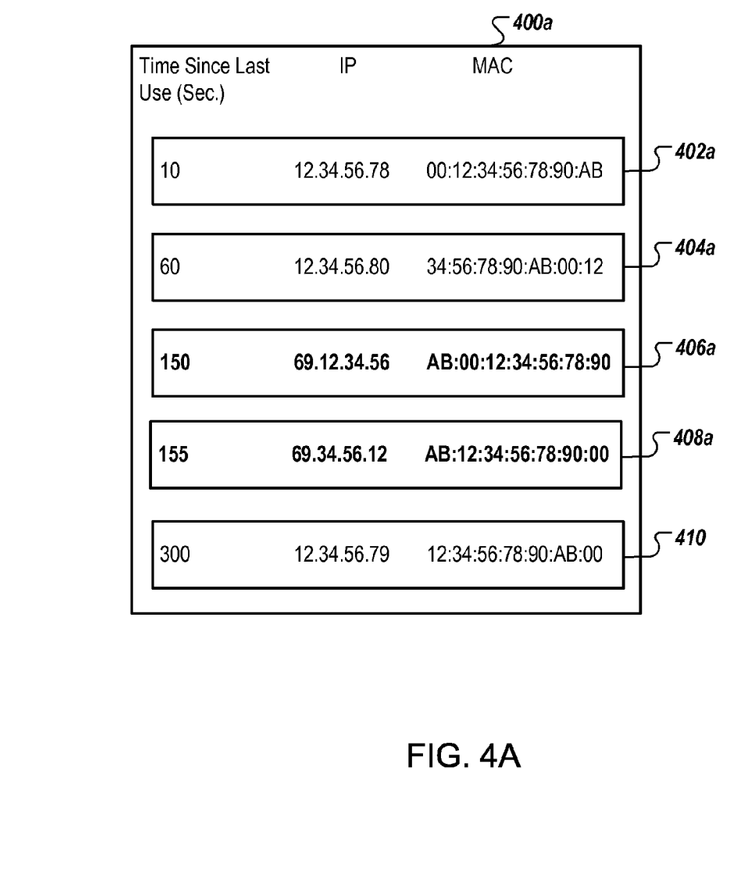
FIGS. 4A-4C illustrate an example application of user-space resource management techniques to ARP table entries.
Figure 4B:
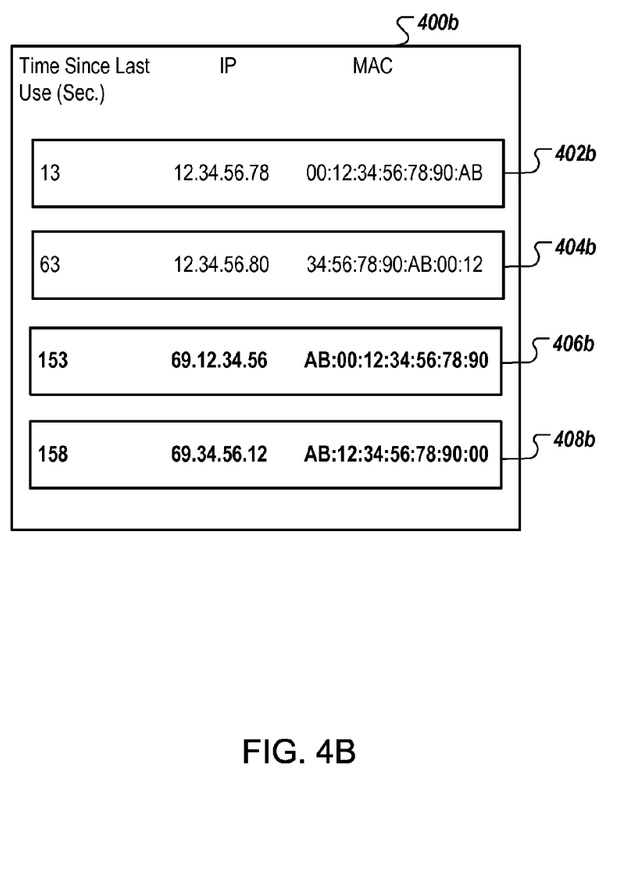
Figure 4C:
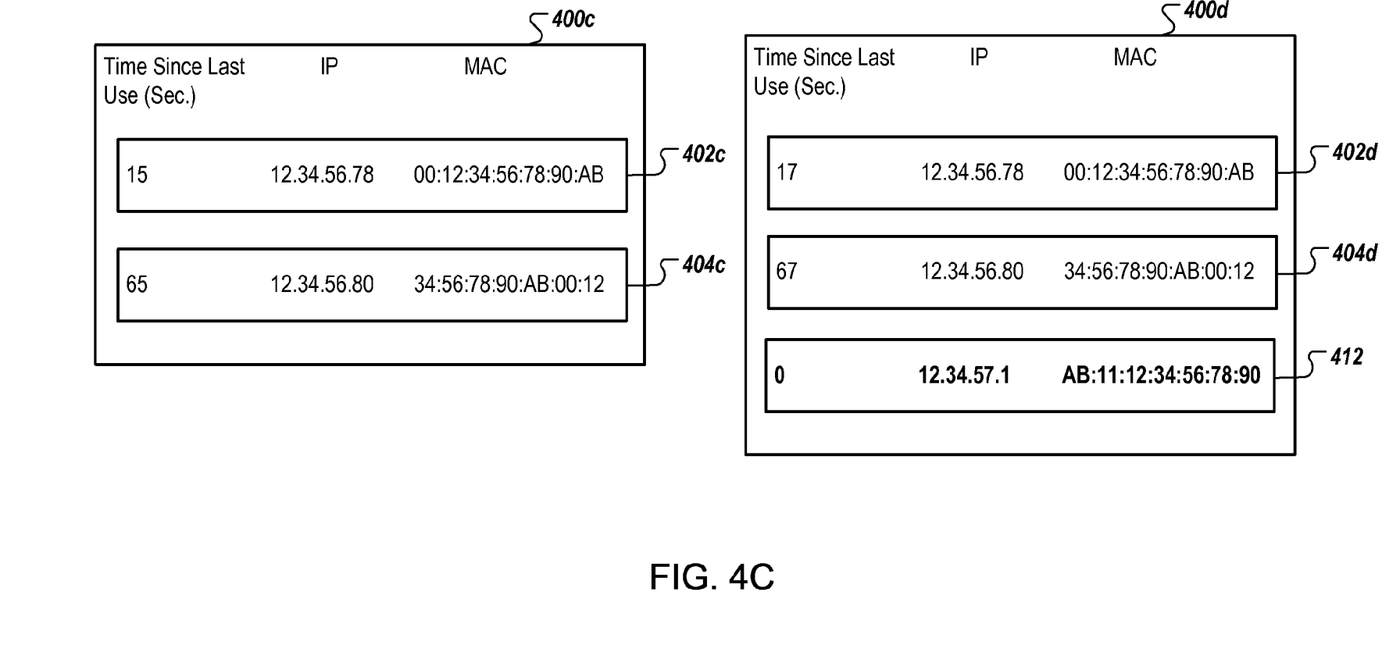

FIGS. 4A-4C illustrate example user-space resource management techniques being applied to ARP table entries. Blocks 400 represent a part of an ARP table that is stored in kernel memory space of a device. Blocks 400a, 400b, 400c, and 400d each represents a snapshot of the ARP table at a certain time. For convenience, and by way of illustration, the time corresponding to each of ARP tables 400a, 400b, 400c, and 400d will be referred to as second 0, second 3, second 5, and second 7, respectively. At second 0, ARP table 400a can contain entries 402a, 404a, 406a, 408a, and 410.

Each of the entries can associate an IP address with a MAC address. Each of the entries can have an associated parameter (e.g., TSLU). The TSLU parameter can specify a number of seconds since the entry has been created, updated, or last used (e.g., when a data packet is sent or received using the entry). Entries 406a and 408a are labeled in bold letters to indicate that these two entries are fictitious. The two fictitious entries had entered ARP table 400a through a malicious network attack. For example, the MAC addresses in entries 406a and 408a can be invalid, entered into ARP table 400a through a DoS attack.

At second 3, ARP table 400b can contain entries 402b, 404b, 406b, and 408b. By way of illustration, a resource management rule internal to the kernel is invoked shortly before second 3 (e.g., at second 2). The kernel resource management rule can be triggered by various factors defined in the kernel (e.g., when the entries in ARP table 400a reached a certain number, etc.). The kernel resource management rule can specify that entries whose TSLU value exceeds a threshold (e.g., 300 seconds) shall be removed. At time of the rule invocation, entry 410 can have a TSLU value (e.g., 302 seconds) that exceeded the threshold. Therefore, entry 410 was removed. At time of the rule invocation, fictitious entries 406b and 408b each had a TSLU value that was below the threshold. Thus, entries 406b and 408b were not removed. As a result, after the kernel resource management rule has been applied, legitimate entry 410 is removed from ARP table 400b. Fictitious entries 406b and 408b both remain in ARP table 400b.

At second 5, ARP table 400c can contain entries 402c and 404c. By way of illustration, a user-space resource manager can be invoked just before second 5 (e.g., at second 4). The user-space resource manager can apply resource management policies that are stored in the user space. One example policy can specify that once the number of entries in ARP table 400 reaches a predefined number n, an LRU rule shall be applied for selecting one or more entries to be modified. The LRU rule can specify that the entries in the current ARP table (e.g., ARP table 400b at second 4) shall be ranked by the TSLU value of each entry. The LRU rule can further specify that least recently used x-percent (e.g., fifty-percent) of entries shall be selected and purged. ARP table 400b contains four entries. After the user-space resource manager applies the LRU rule, entries 402c and 404c remain in the ARP table, while fictitious entries 406b and 408b are selected and removed.

At second 7, ARP table 400d can contain entries 402d, 404d, and 412. By way of illustration, the user-space resource manager performed a proactive probe and inserted new entry 412 just before second 7 (e.g., at second 6). The user-space resource manager has detected an ARP request from a neighboring router having an IP address 12.34.57.1. The user-space resource manager adds entry 412 to ARP table 400*d*. The user-space resource manager performs a proactive probe to determine that the router's MAC address. The user-space resource manager refreshes entry 412. Entry 412 is labeled in bold letters to indicate that entry 412 has been added by the user-space resource manager rather than a standard ARP kernel function.

Figure 5:
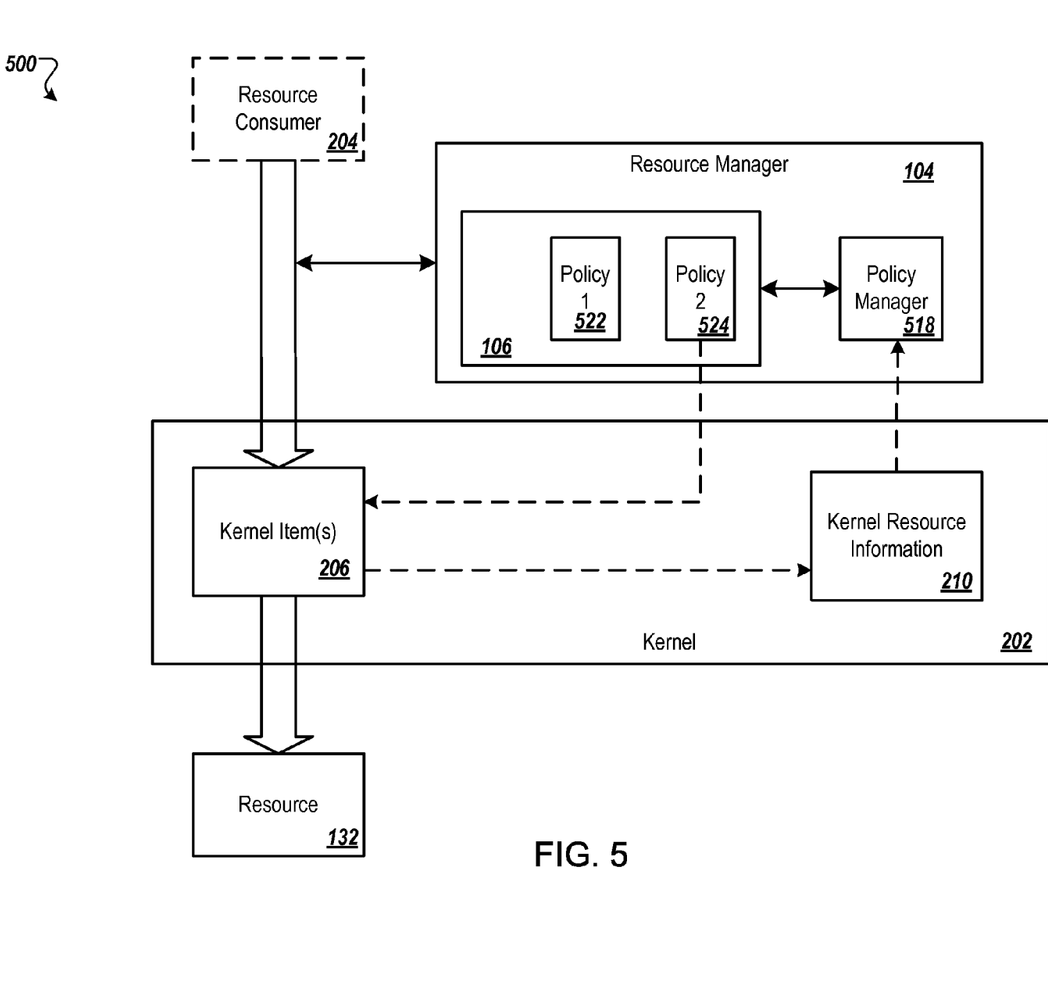
FIG. 5 is a block diagram illustrating example implementations of user-space resource management techniques where various management policies are used based on various resource usage patterns.

FIG. 5 is a block diagram illustrating example implementations of user-space resource management techniques where various management policies are used based on various resource usage patterns. For convenience, the example user-space resource management techniques will be described in reference to a system 500 that implements the techniques.

System 500 can include memory that is partitioned into user memory space and kernel memory space. Kernel 202 can execute in the kernel space. User-space resource manager 104 can execute in the user memory space. Block 204 represents a resource consumer. Block 204 can be either an application program that executes on system 500 (e.g., an application program that executes in the user space), or an entity outside of system 500 (e.g., network traffic). Therefore, block 204 is marked in dashed borders.

Resource consumer 204 can cause kernel 202 to create and maintain kernel items 206. Kernel items 206 can use or otherwise depend upon resource 132. Resource 132 can be kernel resource (e.g., kernel memory). User-space resource manager 104 can include various policies within resource management policies 106, which can be stored in the user memory space. The user-space resource manager 104 can evaluate one or more resource management policies for the kernel items 206 based on a pattern that resource consumer 204 uses the kernel items 206.

By way of illustration, resource consumer 204 can include network traffic including ARP requests and responses. The kernel items 206 can include ARP table entries. The resource 132 can include kernel memory used by the ARP table entries. The network traffic can cause the ARP table entries to be created or updated.

Resource manager 104 can create one or more raw sockets to listen on incoming ARP request and reply packets. From information gathered from the raw sockets, the resource manager 104 can maintain a usage pattern of ARP requests and replies. The usage pattern can be analyzed to detect malicious network attacks such as DoS attacks. By way of illustration, the user-space resource manager 104 can maintain a "regular" pattern on how ARP requests arrive. The pattern can specify that at a particular time of a particular weekday, ARP requests arrive at a router or a server computer at a rate of x requests per minute. The user-space resource manager 104 can compare a current pattern of resource usage with the regular pattern to detect anomalies. When the ARP requests arrive at a significantly higher rate for a period, the resource manager 104 can invoke corresponding measures to determine whether a DoS attack is in progress. For example, the resource manager 104 can employ a challenge and response mechanism on some of the ARP table entries to determine the validity of the IP/MAC address mappings contained in the entries.

User-space resource manager 104 can include flexible resource management policies tailored to various network usage patterns. For example, the resource manager 104 can include resource management policies 106. The resource management policies 106 can include policy 522 and policy 524 for selecting the ARP table entries for modification, each policy corresponding to a network usage pattern. By way of illustration, policy 522 can include LRU rules, which can be utilized to select ARP table entries when network usage is light (e.g., when timing out entries is sufficient to keep the size of the ARP table under control). Policy 524 can include LFU rules, which can be utilized when the network usage is heavy (e.g., when timing out entries is insufficient to keep the size of the ARP table under control). LFU rules can be applicable for removing the ARP table entries even when the entries are relatively "fresh" in the ARP table, therefore can be regarded as more aggressive in purging the entries.

User-space resource manager 104 can also include policy manager 518, which can include an analytical engine for analyzing patterns of ARP requests and responses. Policy manager 518 can perform the analysis based on the information from the raw sockets as well as kernel resource information 210 received from one or more netlink sockets. Receiving the kernel resource information 210 can include either actively acquiring the kernel resource information 210 (e.g., by invoking a read function in a kernel read API) or passively acquiring the kernel resource information 210 (e.g., by listening on a port of the kernel 202), or both. As a result of the analysis, the policy manager 518 can conclude that the device (e.g., router or server computer) is under heavy attack or light attack. Based on the conclusion, policy manager 518 can elect a corresponding policy for selecting content items for modification. For example, the policy manager 518 can determine that resource consumer 204 (e.g., numerous ARP requests) is creating an abnormally large number of kernel items 206 (e.g., ARP table entries). Based on the determination, the policy manager 518 can conclude that there is a high probability that a DoS attack is under way. Based on the conclusion, the policy manager 518 can opt for the policy 524, which uses LFU rules to select the kernel items 206 for modification. Thus, the least frequently used ARP table items can be selected for modification. The user-space resource manager 104 can communicate a request for modification (e.g., removal) of the selected ARP table entries to the kernel 202.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, a network routing device, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or a routing device, e.g., a network router, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs executing on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

An electronic document (which for brevity will simply be referred to as a document) can, but need not, correspond to a file. A document can be stored in a portion of a file that holds other documents, in a single file dedicated to the document in question, or in multiple coordinated files.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method, comprising:
receiving, in a user memory space, kernel resource information from a kernel executing in a kernel memory space, the kernel resource information identifying one or more kernel items in the kernel memory space that depend on kernel resources;
maintaining, in the user memory space, a plurality of resource management policies, wherein each resource management policy includes one or more rules on when to modify kernel items in the kernel memory space, wherein modifying kernel items includes changing kernel items in the kernel memory space or removing kernel items from the kernel memory space;
analyzing, in the user memory space, a pattern of resource usage;
selecting, in the user memory space and based on the pattern of resource usage, a first resource management policy from among the plurality of resource management policies;
selecting a kernel item to be modified according to the selected first resource management policy in order to release some or all of the kernel resources; and
communicating a request to the kernel to modify the selected kernel item.

2. The method of claim 1, wherein the first resource management policy includes one or more rules on when to modify kernel items that are Address Resolution Protocol (ARP) table entries.

3. The method of claim 2, wherein the first resource management policy is a least recently used policy that ranks the ARP table entries based on an amount of time since last use, and wherein the selected kernel item was least recently used by the kernel among the kernel items that are ARP table entries.

4. The method of claim 2, wherein the first resource management policy is a least frequently used policy that ranks the ARP table entries based on a frequency of use, and wherein the selected kernel item was least frequently used by the kernel among the kernel items that are ARP table entries.

5. The method of claim 1, wherein the kernel items are entries in a routing table.

6. The method of claim 5, wherein the first resource management policy is a route selection policy that ranks routes in the routing table based on one or more configurable preference values for routing protocols, and wherein the selected kernel item is an External Gateway Protocol (EGP) route.

7. The method of claim 6, wherein the request to modify the selected kernel item includes a request to increase a cost associated with the EGP route.

8. The method of claim 1, wherein the request to modify the selected kernel item is a request to delete the selected kernel item.

9. The method of claim 1 wherein the resource management policies include one or more policies that each correspond to a kernel resource usage pattern.

10. The method of claim 9 wherein evaluating the one or more resource manage policies includes selecting a policy from the resource management policies based on the kernel resource usage pattern.

11. The method of claim 1, wherein analyzing the pattern of resource usage includes monitoring a rate at which routing table entries are created by the kernel.

12. A computer program product, encoded on a computer-readable storage device, operable to cause data processing apparatus to perform operations comprising:
receiving, in a user memory space, kernel resource information from a kernel executing in a kernel memory space, the kernel resource information identifying one or more kernel items in the kernel memory space that depend on kernel resources;
maintaining, in the user memory space, a plurality of resource management policies, wherein each resource management policy includes one or more rules on when to modify kernel items in the kernel memory space, wherein modifying kernel items includes changing kernel items in the kernel memory space or removing kernel items from the kernel memory space;
analyzing, in the user memory space, a pattern of resource usage;
selecting, in the user memory space and based on the pattern of resource usage, a first resource management policy from among the plurality of resource management policies;
selecting a kernel item to be modified according to the selected first resource management policy in order to release some or all of the kernel resources; and
communicating a request to the kernel to modify the selected kernel item to the kernel.

13. The program product of claim 12, wherein the first resource management policy includes one or more rules on when to modify the kernel items that are Address Resolution Protocol (ARP) table entries.

14. The program product of claim 13, wherein the first resource management policy is a least recently used policy that ranks the ARP table entries based on an amount of time since last use, and wherein the selected kernel item was least recently used by the kernel among the kernel items that are ARP table entries.

15. The program product of claim 13, wherein the first resource management policy is a least frequently used policy that ranks the ARP table entries based on a frequency of use, and wherein the selected kernel item was least frequently used by the kernel among the kernel items that are ARP table entries.

16. The program product of claim 12, wherein the kernel items are entries in a routing table.

17. The program product of claim 16, wherein the first resource management policy is a route selection policy that ranks routes in the routing table based on one or more configurable preference values for routing protocols, and wherein the selected kernel item is an External Gateway Protocol (EGP) route.

18. The program product of claim 17, wherein the request to modify the selected kernel item includes a request to increase a cost associated with the EGP route.

19. The program product of claim 12, wherein the request to modify the selected kernel item is a request to delete the selected kernel item.

20. The program product of claim 12 wherein the resource management policies include one or more policies that each correspond to a kernel resource usage pattern.

21. The program product of claim 20 wherein evaluating the one or more resource manage policies includes selecting a policy from the resource management policies based on the kernel resource usage pattern.

22. The program product of claim 12, wherein analyzing the pattern of resource usage includes monitoring a rate at which routing table entries are created by the kernel.

23. A system comprising:
a computer-readable storage device including a computer program product;
one or more processors configured to interact with the storage device and execute the program product to perform operations comprising:
receiving, in a user memory space, kernel resource information from a kernel executing in a kernel memory space, the kernel resource information identifying one or more kernel items in the kernel memory space that depend on kernel resources;
maintaining, in the user memory space, a plurality of resource management policies, wherein each resource management policy includes one or more rules on when to modify kernel items in the kernel memory space, wherein modifying kernel items includes changing kernel items in the kernel memory space or removing kernel items from the kernel memory space;
analyzing, in the user memory space, a pattern of resource usage;
selecting, in the user memory space and based on the pattern of resource usage, a first resource management policy from among the plurality of resource management policies;
selecting a kernel item to be modified according to the selected first resource management policy in order to release some or all of the kernel resources; and
communicating a request to the kernel to modify the selected kernel item to the kernel.

24. The system of claim 23, wherein the first resource management policy includes one or more rules on when to modify kernel items that are Address Resolution Protocol (ARP) table entries.

25. The system of claim 24, wherein the first resource management policy is a least recently used policy that ranks the ARP table entries based on an amount of time since last use, and wherein the selected kernel item was least recently used by the kernel among the kernel items that are ARP table entries.

26. The system of claim 24, wherein the first resource management policy is a least frequently used policy that ranks the ARP table entries based on a frequency of use, and wherein the selected kernel item was least frequently used by the kernel among the kernel items that are ARP table entries.

27. The system of claim 23, wherein the kernel items are entries in a routing table.

28. The system of claim 27, wherein the first resource management policy is a route selection policy that ranks routes in the routing table based on one or more configurable preference values for routing protocols, and wherein the selected kernel item is an External Gateway Protocol (EGP) route.

29. The system of claim 28, wherein the request to modify the selected kernel item includes a request to increase a cost associated with the EGP route.

30. The system of claim 23, wherein the request to modify the selected kernel item is a request to delete the selected kernel item.

31. The system of claim 23 wherein the resource management policies include one or more policies that each correspond to a kernel resource usage pattern.

32. The system of claim 31 wherein evaluating the one or more resource manage policies includes selecting a policy from the resource management policies based on the kernel resource usage pattern.

33. The system of claim 23, wherein analyzing the pattern of resource usage includes monitoring a rate at which routing table entries are created by the kernel.

\* \* \* \* \*